United States Patent
Sirotkin et al.

(10) Patent No.: US 9,749,377 B2
(45) Date of Patent: Aug. 29, 2017

(54) METHOD AND SYSTEM FOR NETWORK ACCESS CONTROL

(75) Inventors: Sasha Sirotkin, Petach Tikva (IL); Muthaiah Venkatachalam, Beaverton, OR (US); Avishay Sharaga, Bet Nehemya (IL)

(73) Assignee: INTEL CORPORATION, Santa Clara, CA (US)

( * ) Notice: Subject to any disclaimer, the term of this patent is extended or adjusted under 35 U.S.C. 154(b) by 12 days.

(21) Appl. No.: 13/976,455

(22) PCT Filed: Dec. 16, 2011

(86) PCT No.: PCT/US2011/065349
§ 371 (c)(1),
(2), (4) Date: Jun. 26, 2013

(87) PCT Pub. No.: WO2013/019260
PCT Pub. Date: Feb. 7, 2013

(65) Prior Publication Data
US 2013/0291075 A1    Oct. 31, 2013

Related U.S. Application Data

(60) Provisional application No. 61/514,010, filed on Aug. 1, 2011.

(51) Int. Cl.
*G06F 3/00*   (2006.01)
*H04L 29/06*   (2006.01)
(Continued)

(52) U.S. Cl.
CPC .......... *H04L 65/60* (2013.01); *H04L 63/0815* (2013.01); *H04L 63/0884* (2013.01);
(Continued)

(58) Field of Classification Search
CPC ... H04W 84/045; H04W 80/04; H04W 12/02; H04W 24/10; H04W 12/06; H04W 4/22;
(Continued)

(56) References Cited

U.S. PATENT DOCUMENTS 8,391,371 B2   3/2013   Klein Middlelink et al.
2004/0219913 A1   11/2004   Lee et al.
(Continued)

FOREIGN PATENT DOCUMENTS

| JP | 2010206572 | | 9/2010 |
|---|---|---|---|
| WO | WO 2012/034598 | * | 9/2010 |
| WO | WO 2012034598 A1 | * | 3/2012 |

OTHER PUBLICATIONS

International Search Report and Written Opinion, Mailed Date: Aug. 20, 2012, Application No. PCT/US2011/065349, Filed Date: Dec. 16, 2011, pp. 11.
(Continued)

*Primary Examiner* — Joseph P Hirl
*Assistant Examiner* — Sayed Beheshti Shirazi

(57) ABSTRACT

An apparatus may include a transceiver and a processor circuit coupled to the transceiver. The apparatus may also include a local packet data network access module operable on the processor circuit to schedule for transmission from the transceiver to a mobility management entity (MME) a request from a user equipment (UE) for access to a local network, to generate a request for authentication to be sent to the UE, and to receive authentication information sent in response to the request for authentication. Other embodiments are disclosed and claimed.

18 Claims, 15 Drawing Sheets

(51) Int. Cl.

| | | |
|---|---|---|
| *H04W 12/06* | (2009.01) | |
| *H04W 72/02* | (2009.01) | |
| *H04W 52/02* | (2009.01) | |
| *H04W 36/08* | (2009.01) | |
| *H04W 36/14* | (2009.01) | |
| *H04W 4/00* | (2009.01) | |
| *H04L 29/08* | (2006.01) | |
| *H04W 76/04* | (2009.01) | |
| *H04W 36/00* | (2009.01) | |

(52) U.S. Cl.
CPC ........ *H04L 65/1069* (2013.01); *H04L 65/601* (2013.01); *H04L 67/148* (2013.01); *H04L 67/303* (2013.01); *H04W 4/001* (2013.01); *H04W 12/06* (2013.01); *H04W 36/08* (2013.01); *H04W 36/14* (2013.01); *H04W 52/0225* (2013.01); *H04W 72/02* (2013.01); *H04L 63/102* (2013.01); *H04L 65/80* (2013.01); *H04W 4/005* (2013.01); *H04W 36/0038* (2013.01); *H04W 76/046* (2013.01); *Y02B 60/50* (2013.01)

(58) Field of Classification Search
CPC ............... H04W 60/04; H04W 76/028; H04W 76/046; H04W 8/12; H04L 2212/0025; H04L 63/08
USPC .................................. 726/5, 3; 709/220, 229
See application file for complete search history.

(56) References Cited

U.S. PATENT DOCUMENTS

| | | | |
|---|---|---|---|
| 2006/0159031 A1* | 7/2006 | Vialen ................. | H04W 76/021 370/252 |
| 2007/0186273 A1 | 8/2007 | Carpy et al. | |
| 2008/0184032 A1 | 7/2008 | Li et al. | |
| 2009/0264126 A1 | 10/2009 | Khetawat et al. | |
| 2010/0124228 A1 | 5/2010 | Tinnakornsrisuphap et al. | |
| 2010/0135266 A1 | 6/2010 | Karaoguz et al. | |
| 2011/0038318 A1 | 2/2011 | Parsons et al. | |
| 2011/0075675 A1* | 3/2011 | Koodli .................... | H04L 12/14 370/401 |
| 2011/0170530 A1 | 7/2011 | Akiyoshi | |
| 2011/0188446 A1* | 8/2011 | Bienas ................. | H04W 74/00 370/328 |
| 2011/0271330 A1* | 11/2011 | Zhang ................. | H04L 63/0838 726/5 |
| 2011/0274051 A1* | 11/2011 | Vikberg ................ | H04L 63/101 370/328 |
| 2012/0084449 A1* | 4/2012 | Delos Reyes ....... | H04L 61/1511 709/229 |
| 2012/0147805 A1 | 6/2012 | Kim et al. | |
| 2012/0179789 A1* | 7/2012 | Griot .................... | H04W 12/08 709/220 |
| 2012/0196600 A1 | 8/2012 | Mizukoshi | |
| 2012/0202491 A1* | 8/2012 | Fox ...................... | H04B 7/2609 455/435.1 |
| 2012/0250509 A1* | 10/2012 | Leung ................... | H04W 76/04 370/235 |
| 2012/0276913 A1* | 11/2012 | Lim ...................... | H04W 12/08 455/450 |
| 2012/0329458 A1* | 12/2012 | Hjelmgren ........ | H04W 72/0433 455/436 |
| 2013/0003656 A1* | 1/2013 | Cho ...................... | H04W 48/04 370/328 |
| 2013/0058312 A1* | 3/2013 | Zhou ...................... | H04W 8/12 370/331 |
| 2013/0074149 A1* | 3/2013 | Shaikh .................. | H04W 12/06 726/3 |
| 2013/0189955 A1* | 7/2013 | Horn ...................... | H04W 4/08 455/411 |
| 2013/0301609 A1* | 11/2013 | Smith ............... | H04W 72/0493 370/331 |
| 2014/0335830 A1* | 11/2014 | Wu ...................... | H04W 60/00 455/411 |
| 2016/0381720 A1* | 12/2016 | Baek ...................... | H04W 8/14 370/329 |

OTHER PUBLICATIONS

Extended European Search Report received for European Patent Application No. 11870375.0, mailed Feb. 26, 2015, 5 pages.

Office Action received for Korean Patent Application No. 2014-7004856, mailed Feb. 15, 2016, 7 pages including 3 pages English translation.

Decision of Grant received for Russian Patent Application No. 2014107670, mailed Sep. 29, 2015, 9 pages (untranslated).

Notice of Allowance received for Japanese Patent Application No. 2014-523909, mailed May 12, 2015, 3 pages (untranslated).

Office Action received for Korean Patent Application No. 2014-7004856, mailed Jun. 10, 2015, 8 pages including 3 pages English translation.

* cited by examiner

METHOD AND SYSTEM FOR NETWORK ACCESS CONTROL

This application claims priority to U.S. provisional patent application No. 61/514,010, filed Aug. 1, 2011 and incorporated by reference herein in its entirety.

BACKGROUND

In the present day, standards are evolving to accommodate wireless communications over heterogeneous networks. In some scenarios, a wireless device user coupled to a public land mobile network (PLMN) may wish to connect to a local home or business network, whether the user is present at a location within the home network or while at a location remote from the home network. To facilitate local network access for a user equipment (UE) owner, the $3^{rd}$ Generation Partnership Project (3GPP) has defined basic functionality for local network access in a 3GPP Long Term Evolution (LTE) standard referred to as Local Internet Protocol (IP) Access (LIPA) (see release 11, Technical Specification 22.220 v11.2.0; Technical Specification Group Services and System Aspects; Service requirements for Home Node B (HNB) and Home eNode B (HeNB); September 2011) (hereinafter referred to as "LIPA." In particular, LIPA signifies the capability of a mobile station (or "user equipment" (UE)) to obtain access to a local residential/enterprise IP network (herein also termed a local network or home network) that is connected to one or more localized base stations termed home eNodeBs or H(e)NBs. LIPA allows a UE to connect to devices in the local network—e.g. printers, video cameras, or a local web-server.

In addition to using LIPA, a network operator that operates a macro network may, e.g. as a chargeable user service, also wish to provide access to a user's local femtocell network. Access to the user's local network when a UE is under coverage of the macro network has been described in LIPA, TS 22.220 section 5.8, under the name of "Managed Remote Access to home based network" (MRA). From user's perspective LIPA and MRA describe the same service, namely access to a local network, with the difference centering on whether the UE is under coverage of a macro network base station (or eNodeB ((e)NB)) or under control of the femtocell base station (H(e)NB).

However, users may be very reluctant to deploy an H(e)NB that is provisioned with MRA, since this may effectively delegate access control management of their home or enterprise network to a $3^{rd}$ party. Therefore, implementation of an H(e)NB with MRA may require improvements for a hosting party access control to ensure robust, consistent and secure implementation.

It is with respect to these and other considerations that the present improvements have been needed.

DETAILED DESCRIPTION

Figure 1:
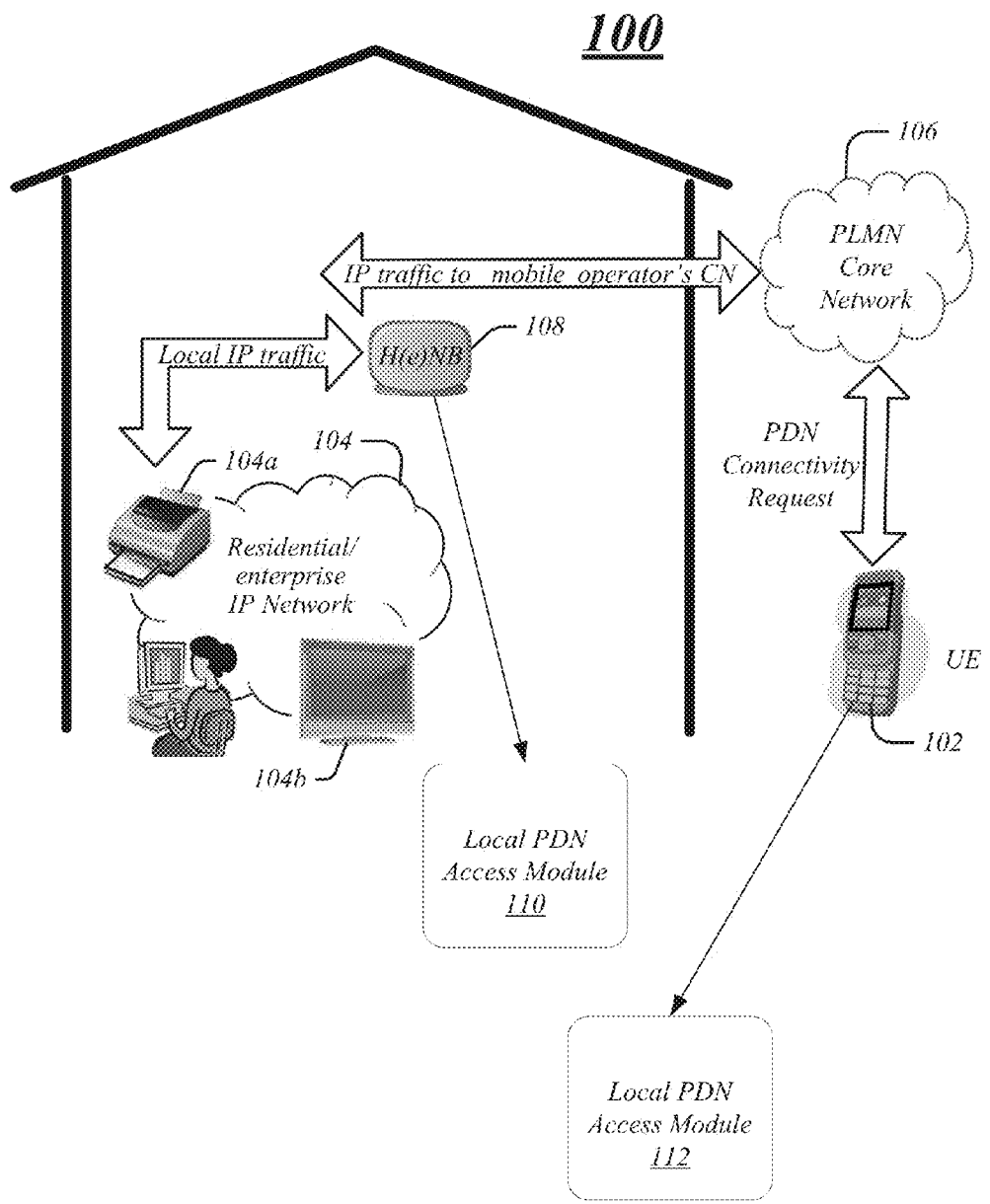
FIG. 1 depicts a system consistent with various embodiments.

Some embodiments of a communications system may be implemented with a radio technology such as 3GPP LTE-A, including in particular, the 3GPP LTE-A LIPA standard (TS 22.220). LTE-advanced (LTE-A) is an evolution of the 3GPP LTE.

Various embodiments are related to provision of authentication to be implemented in an H(e)NB to allow MRA access control. The terms "home network" and "local network" as used herein may refer to a residential/enterprise IP network packet data network that may also include a home base station (H(e)NB) to provide wireless access to the home network. The term "femtocell" as used herein generally may refer to a radio network that is part of an operator network serviced by a H(e)NB. As such, the H(e)NB may form a node in the femtocell to connect the home network to the operator network (also termed herein "public land mobile network" or "PLMN" unless otherwise noted). In this regard, it is to be noted that in a given operator network, the femtocell may not always be under the coverage of an eNB of a macrocell. In various embodiments, the femtocell linked to a home network may operate in a closed subscriber group (CSG) mode in which a limited number of members that constitute the CSG are allowed to use the femtocell resources. Such a CSG mode may be commonly found for operations involving a femtocell located in a private enterprise or home setting.

Consistent with various embodiments, authentication procedures may be implemented to facilitate the ability of a UE that subscribes to a macro network to also connect to a home network. In some embodiments, authentication to the home network may take place during an attachment process of the UE, while in other embodiments the authentication may take place via a UE-initiated packet data network (PDN) connectivity request. Some embodiments may provide authentication based on shared secret, e.g., password, while other embodiments may be based upon an access list or similar procedure.

In various embodiments that involve password control, an H(e)NB hosting party may configure a password, a username/password combination, a certificate or authentication/authorization/accounting protocol (AAA) in the H(e)NB (network node) responsible for authentication and/or propagation of the authentication information to all relevant nodes. The term "H(e)NB hosting party" as used herein refers to one generally responsible for operation of the home network, a party that may have a contractual relationship with a network operator, such one responsible for a billing relationship, a lead user of the home network in a household, or a corporate IT manager in an enterprise context, to list a few examples.

Subsequently, during an initial attach procedure, or during a UE Requested PDN Connectivity procedure, if additional authentication is configured for accessing the home network, a UE may trigger a sequence for authentication that allows the UE to couple to the home network. For example, authentication may be automatically triggered by retrieving stored password information, or a UE may provide a user interface that requests authentication. In the latter example, the local PDN access module 304 may include in a request message instructions to manually query a user of UE 102 concerning authentication information. At the UE 102, this query may take the form of a dialog box asking for credentials, which are then used to complete signaling procedures that connect the UE to the local network.

FIG. 1 depicts one system 100 for accessing multiple networks consistent with various embodiments. The system 100 includes a user equipment (UE) 102, a home network 104, a PLMN core network 106, and home eNB (H(e)NB) 108. In the present embodiments, the user of UE 102 may also be a hosting party of the home network 104 as well as a subscriber to the PLMN core network 106. In the scenario depicted in FIG. 1, when the UE 102 is remote from a location of the home network 108, the user may nevertheless wish to access the home network 104 to perform tasks such as controlling operation of local devices 104a, 104b in the home network 104 or accessing information contained in local devices 104a, 104b. The UE 102 may be registered and connected to the PLMN core network 106, such that an active packet data network (PDN) connection exists. To provide managed remote access, in order to couple to the home network 104, the UE 102 may perform procedures to facilitate access to the home network 104 by means of the operator core network 106. For example, the UE 102 may initiate a UE requested PDN connectivity procedure through the PLMN core network 108 that allows the UE 102 to connect to the home network 108. In various embodiments, as detailed below, the H(e)NB 108 may employ a local PDN access module 110 to perform procedures that provide authentication during the UE requested PDN procedure. In addition, the UE 102 may also include a local PDN access module 112 to perform procedures that assist authentication during the UE requested PDN procedure.

Figure 2:
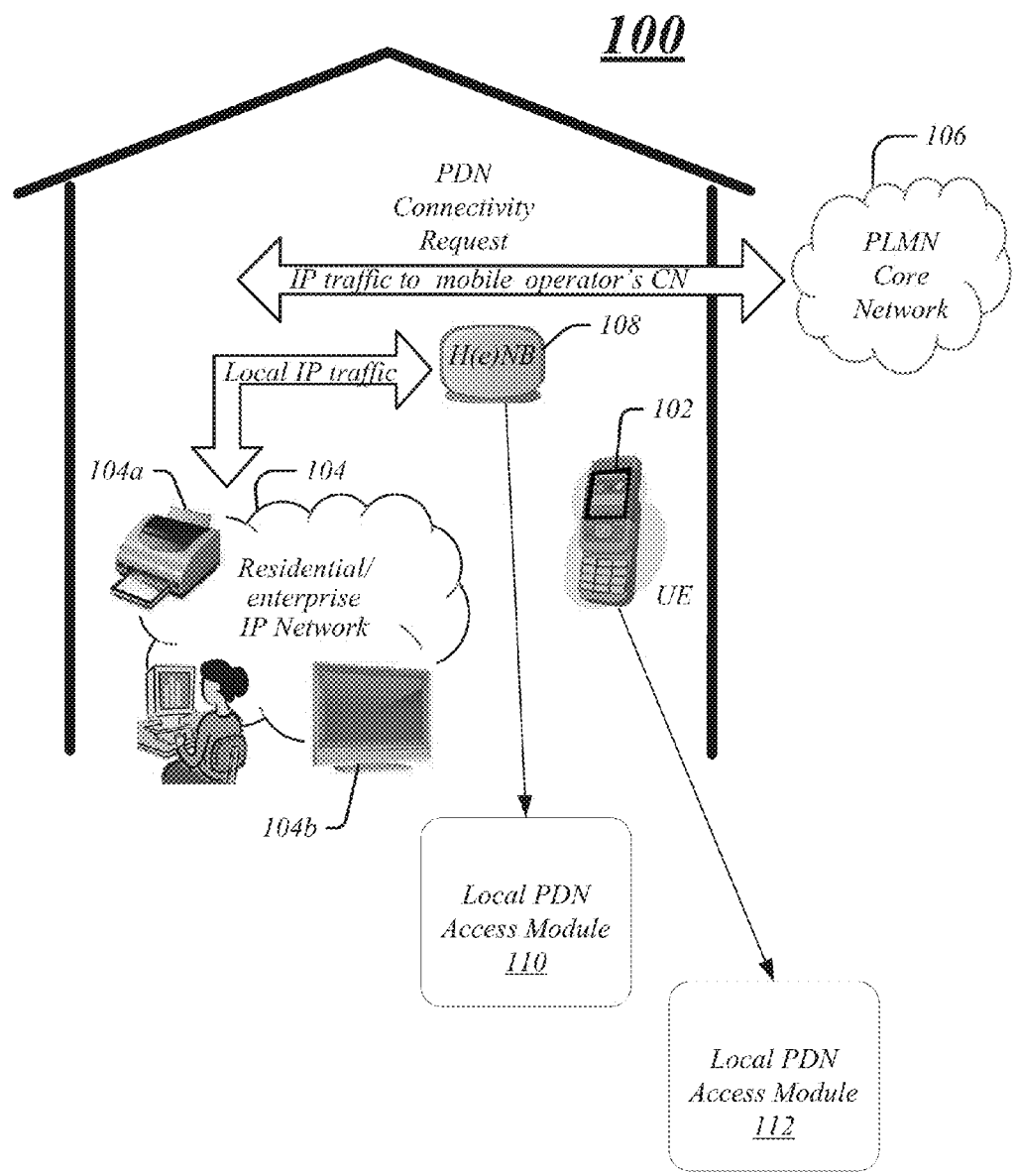
FIG. 2 depicts another scenario of use of the system of FIG. 1.

Consistent with additional embodiments, FIG. 2 depicts another scenario of use of the system 100 in which the UE 102 may be deployed local to the home network 104. In this case, the UE 102 may also initiate a UE requested packet data network connectivity that allows the UE 102 to connect to the home network 104. In the scenarios of FIGS. 1 and 2, a user of UE 102 may perform a similar set of actions that are detailed below to connect to the home network 104.

Figure 3:
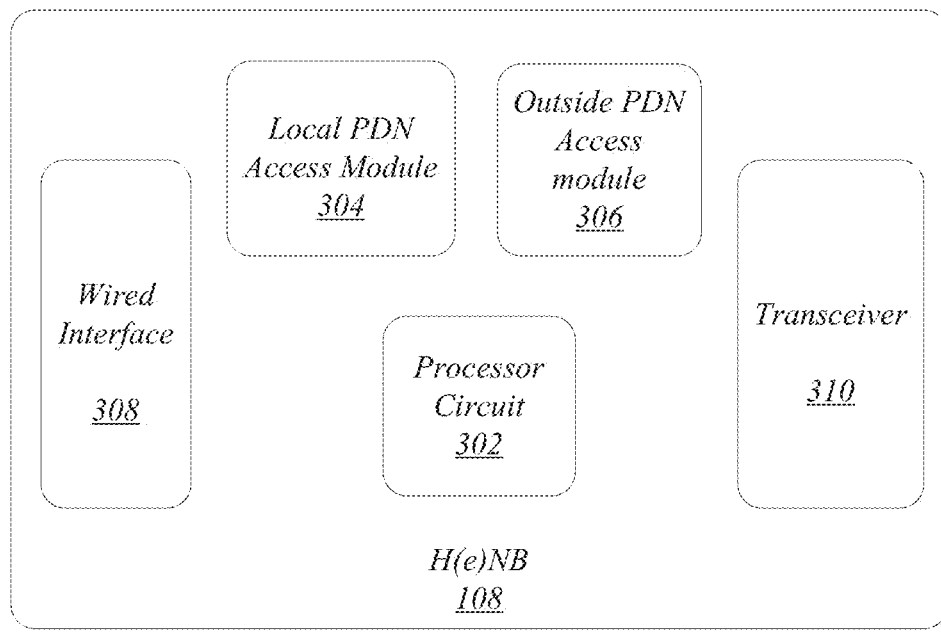
FIG. 3 depicts details of an embodiment of a home base station.

FIG. 3 depicts details of an embodiment of H(e)NB 108. The H(e)NB 108 may include a processing circuit 302, a local PDN access module 304, an outside PDN access module 306, and a wired interface 308. In various embodiments, the outside PDN access module 306 may provide conventional procedures to establish and maintain access to an outside packet data network that is not part of the local PDN. Such outside packet data network may include the internet, for example, or a proprietary data network. The local PDN access module 304 may provide additional procedures that facilitate coupling to a local network, such as a home network for which a user of UE 102 may be a permitted user. The wired interface 308 may be employed to couple the H(e)NB 108 to a local network, such as a home or enterprise network over a wired link.

The local PDN access module 304 may, for instance, schedule for transmission from the transceiver 310 to an MME a request received from a UE for access to a local network. The local PDN access module 304 may also generate a request for authentication to be sent to the UE. Such a request may be generated by an MMW in response to the request for access to a local network. The local PDN access module 304 may also receive authentication receive authentication information sent in response to the request for authentication. This authentication information may be used to complete a process that connects the requesting UE to the local network.

Figure 4:
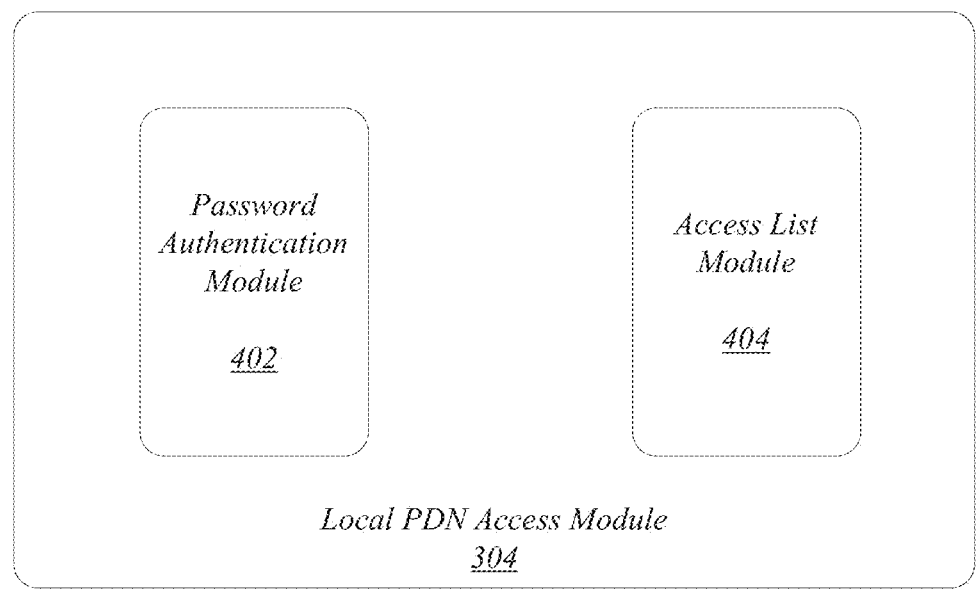
FIG. 4 depicts details of a local packet data network access module consistent with various embodiments.

FIG. 4 depicts details of the local PDN access module 304 consistent with various embodiments. In various embodiments, the local PDN access module 304 may act to provide information to an MME, for example, which can be used to complete the process for connecting to a home network. In some embodiments, the local PDN access module 304 may include a password authentication module 402 for use in connecting to a home network via password verification, or an access list module 404 for use in connecting to a home network based upon an identifier of the UE 102. In some embodiments the local PDN access module 304 may include both the password authentication module 402 and access list module 404, as illustrated in FIG. 4. Consistent with various embodiments, each of these modules 402, 404 may be used to facilitate the performance of a secure LIPA process or MRA process in which the UE 102 links to a home network that may operate under conditions where access is limited, such as under a CSG mode.

Figure 5:
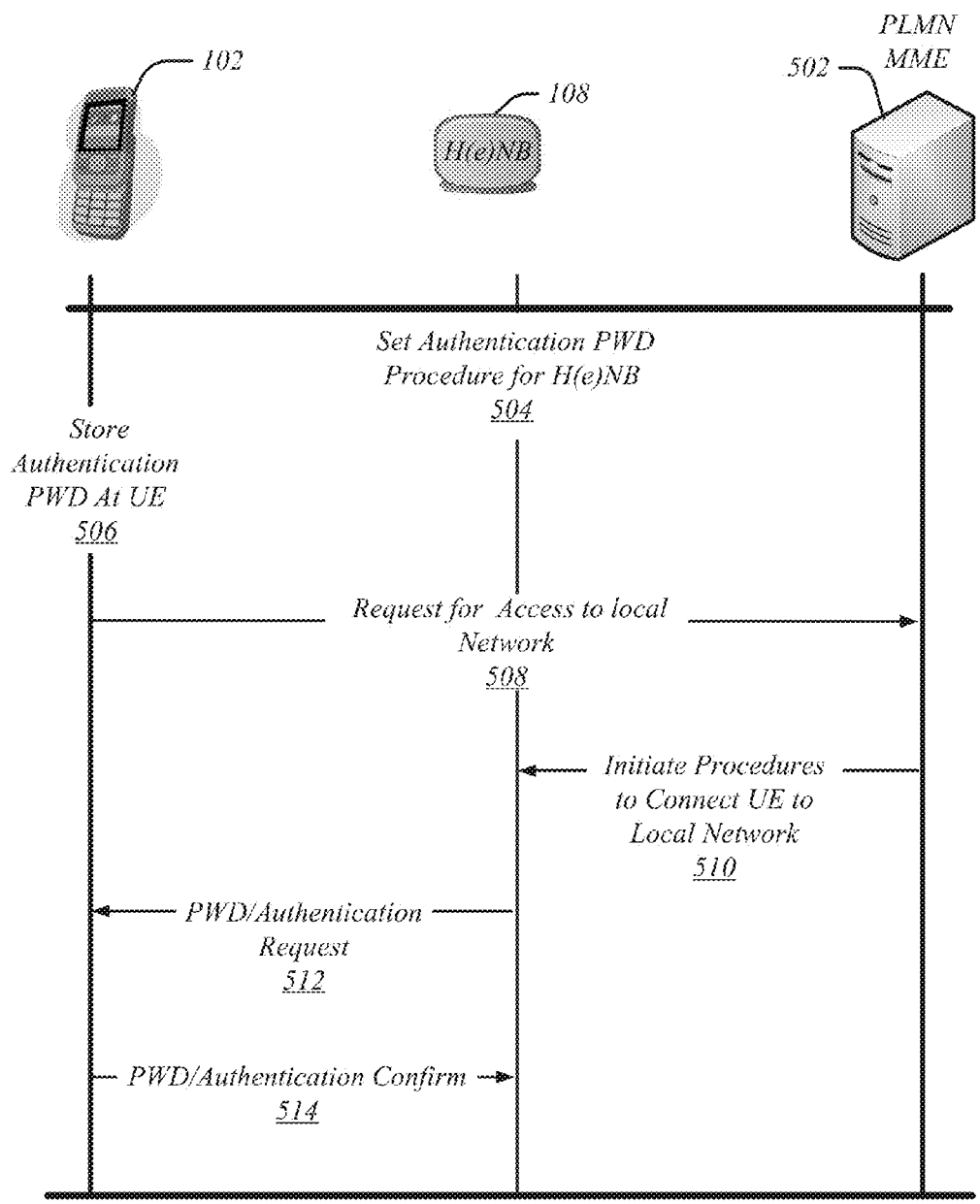
FIG. 5 depicts exemplary operations to establish a connection to a home network consistent with various embodiments.

FIG. 5 depicts exemplary operations to establish a connection to a home network via an MRA/LIPA procedure that employs a password-based authentication. As illustrated, in a first operation 504 a user may set an authentication password and/or password procedure in an H(e)NB 108 of a home network. As noted above, such a process may entail configuring a username/password combination or some other authentication, such as AAA. Although only one H(e)NB 108 is depicted in FIG. 5, in some embodiments, the user may, but need not, configure multiple H(e)NBs in home/enterprise networks that contain more than one H(e)NB. This may be accomplished, for example, by manually configuring multiple H(e)NBs or by configuring a particular node in a home network that may be responsible for authentication and/or propagation of the authentication to all relevant nodes. In various embodiments, a web interface or other convenient means may be used to configure the desired H(e)NB node(s) with the authentication information. In addition, multiple username/password pairs may be configured in an H(e)NB as appropriate.

In a subsequent operation 506, the user may store password/authentication information in the UE 102. The password/authentication information may correspond to password information configured in the H(e)NB 108 in the operation 504. Accordingly, the UE 102 may store a set of information that is to be used when authentication is required in order to access the home network. In operation 508, a request for access to a local network is sent from the UE 102 to a PLMN MME 502 of a public land mobile network. As detailed below, such a request may be sent in conjunction with an attach process when the UE 102 may be establishing connection to the PLMN MME 502 or in conjunction with PDN connectivity request when the UE is already connected to the PLMN MME 502.

When the PLMN MME 502 receives the request for access to a local network, the PLMN MME 502 may perform actions to facilitate access to the local network. For example, as illustrated in the operation 510 of FIG. 5, the PLMN MME 502 may return a message to the local network to initiate procedures to connect the UE 102 to the local network, including the H(e)NB 108.

Upon receiving a message to initiate procedures to connect the UE 102 to the local network, the H(e)NB 108 may initiate an authentication procedure in order to complete the process for providing to the UE 102 the requested access to the home network of the H(e)NB 108. For example, the H(e)NB may retrieve from its memory (not shown) a password or other authentication information associated with the UE 102. As illustrated in FIG. 5, in operation 512, the H(e)NB may send a wireless message to the UE 102 requesting information related to the retrieved password or other authentication based upon the procedures established in the operations 504, 506.

In the operation 514, the UE 102, if properly configured with the correct information, may return an authentication message to the H(e)NB 108 that includes information that allows the H(e)NB to discern that the UE 102 is configured with the proper password or other authentication. If the information received from the operation 514 is deemed to be correct, the H(e)NB 108 may then initiate further procedures to complete the establishing of a connection to the UE 102.

In other embodiments, a process for establishing home network connection using LIPA or MRA may entail modifying existing procedures as specified in 3GPP TS 23.401 (Technical Specification 23.401 v 10.5.0; $3^{rd}$ Generation Partnership Project; Technical Specification Group Services and System Aspects; General Packet Radio Service (GPRS) enhancements for Evolved Universal Terrestrial Radio Access Network (E-UTRAN) access; September 2011).

Figure 6:
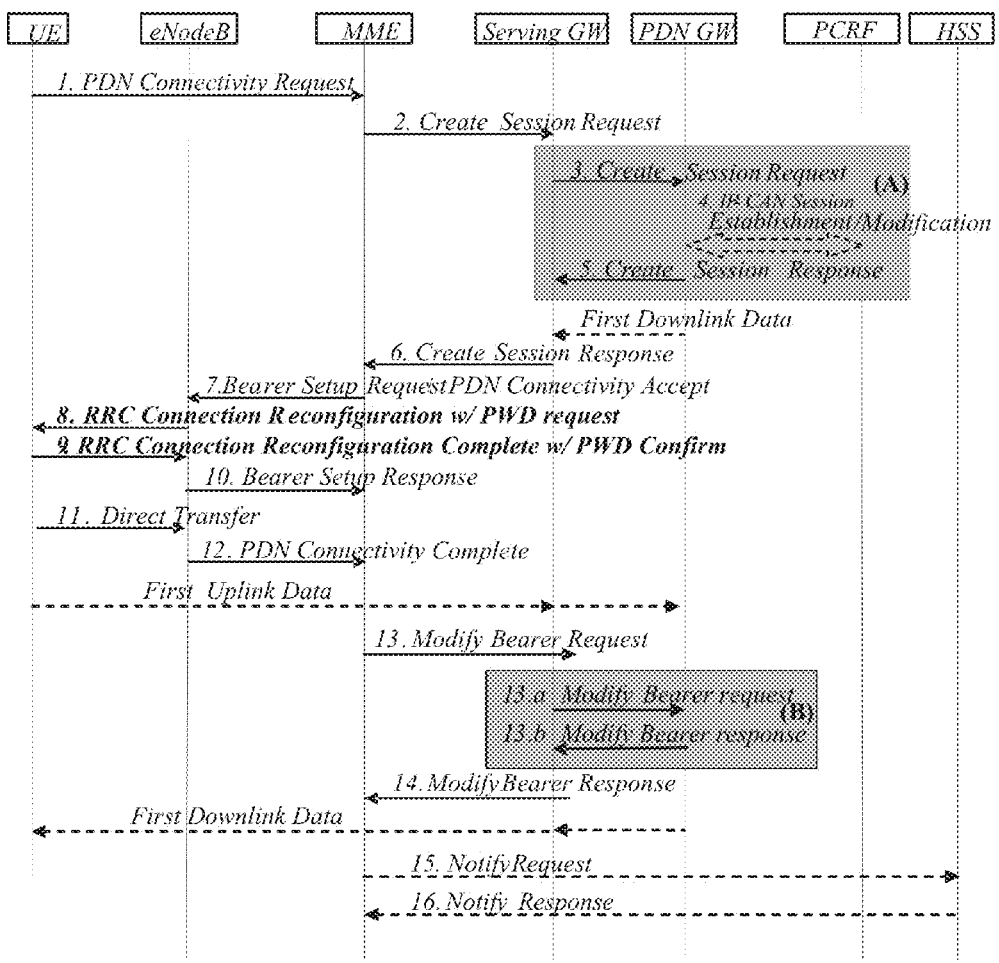
FIG. 6 depicts exemplary signaling operations for authentication to a home network consistent with additional embodiments.

FIG. 6 depicts exemplary signaling operations for authentication of a UE to a home network consistent with further embodiments. The set of operations shown in FIG. 6 present a modification of the operations specified in §5.10.2 of 3GPP TS 23.401, which describes a request for packet data network connectivity. The terms "operations" or "signaling operations" as used herein may refer to the performance of tasks that are specified by messages or other signals, and/or the act of sending the messages or other signals between different entities as illustrated in the FIGs. In particular, the operations depicted in FIG. 6 illustrate a scenario in which a UE may establish a PDN connection to a home network via what is specified in section §5.10.2 as a "UE requested PDN connectivity" procedure. In order to provide accessibility to a home network in a secure fashion for a UE, in various embodiments the procedures of §5.10.2 of 3GPP TS 23.401 are altered to require authentication to be established between the home network and the requesting user or UE. In the example of FIG. 6, the operations depicted in bold represent modified or augmented procedures based upon the conventional procedures of §5.10.2.

In particular, the embodiment of FIG. 6 involves authentication between an H(e)NB and UE during an RRC (radio resource control) connection reconfiguration message exchange. Thus, in general, the operations 1-7 and 10-16 of FIG. 6 may be performed as specified in §5.10.2, while the operations 8. RRC connection reconfiguration and operation 9. RRC connection reconfiguration complete are modified or supplemented. Thus, during the RRC connection reconfiguration message sent from the H(e)NB to a UE, the H(e)NB may request authentication based on a password or password/user or other similar combination of information from the UE to determine whether to allow the UE access to the home network. Subsequently, during an RRC connection reconfiguration complete message, the UE may return authentication information to the H(e)NB. In embodiments based upon a commonly shared password, the authentication information returned by the UE need not contain an actual shared password, but may contain information indicating that the UE is in possession of the shared password. Accordingly, the process depicted by the operations of FIG. 6 allows an H(e)NB to provide convenient access via established set of procedures to a home network for a UE that may be remote from the home network, while still limiting home network access in a secure manner by requiring a password authentication.

In other embodiments, when a UE is performing an initial attach procedure to attach to a PDN, the RRC connection signaling may be modified to allow authentication of the UE to a home network.

Figure 7:
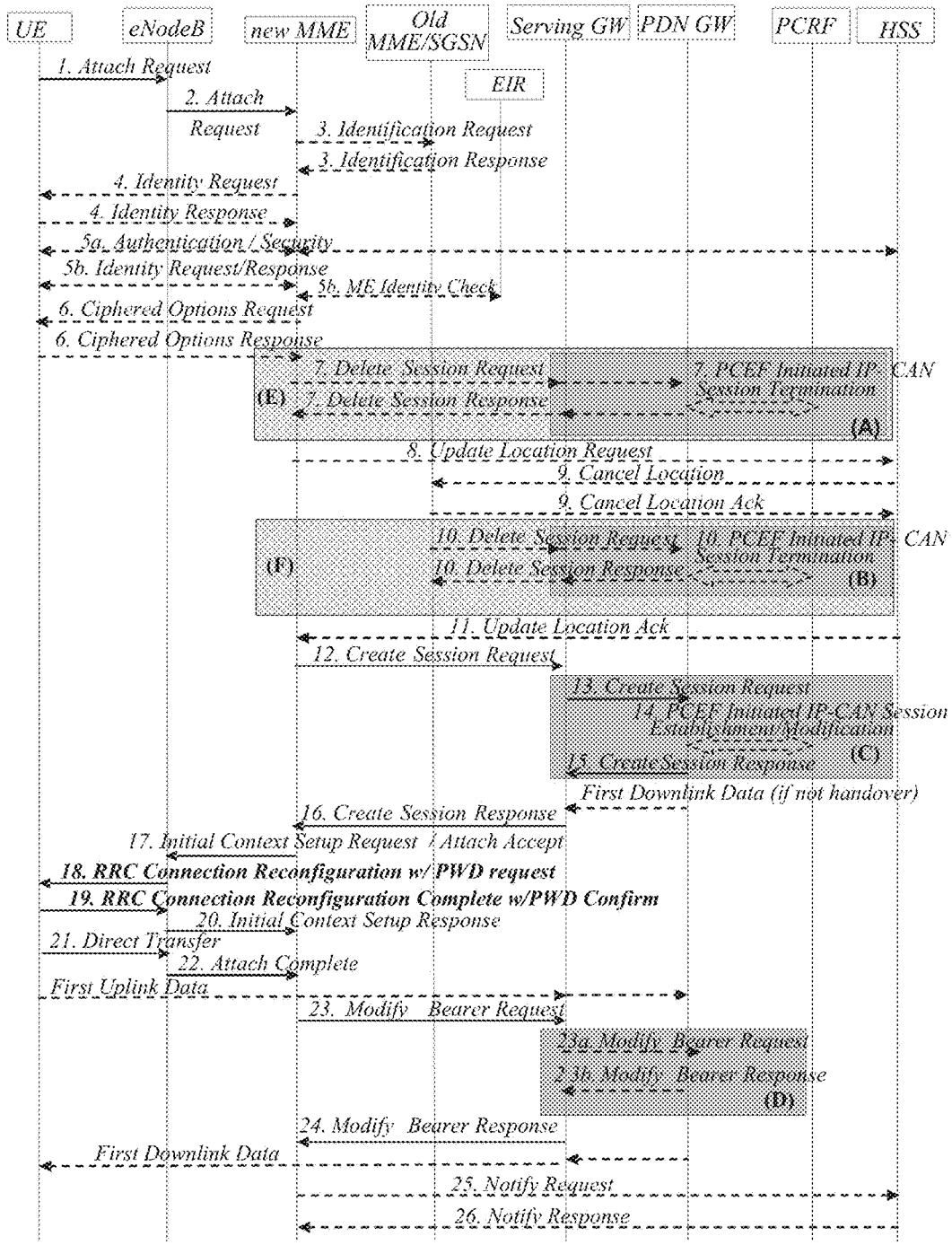
FIG. 7 depicts exemplary signaling operations for authentication to a home network consistent with other embodiments.

FIG. 7 depicts exemplary signaling for authentication to a home network consistent with further embodiments. The set of operations shown in FIG. 7 present a modification of the operations specified in §5.3.2.1 of 3GPP TS 23.401, which describes an E-UTRAN initial attach procedure. In order to provide accessibility to a home network for a UE during an initial attach procedure, the operations specified in §5.3.2.1 of 3GPP TS 23.401 are altered to require authentication to be established before a requesting UE is allowed to be connected to the home network. As with FIG. 6, in FIG. 7, the operations depicted in bold represent modified or augmented procedures with respect to the conventional procedures of §5.3.2.1.

In particular, the embodiment of FIG. 7 involves authentication between an H(e)NB and UE during an RRC connection reconfiguration message exchange that may take place at the operations 18. and 19. Thus, in general, the operations 1-17 and 20-26 of FIG. 7 may be performed as specified in §5.3.2.1, while the operations 19. RRC connection reconfiguration and operation 9. RRC connection reconfiguration complete are modified or supplemented. As illustrated in FIG. 7, during the RRC connection reconfiguration message sent from the H(e)NB to a UE, the H(e)NB may request password-based or other authentication from the UE to determine whether to allow the UE access to the home network. Subsequently, during an RRC connection reconfiguration complete message, the UE may return authentication information to the H(e)NB.

For the above procedures generally depicted in FIGS. 6 and 7, during the RRC Connection Reconfiguration operation, when an H(e)NB asks for password authentication, the UE receiving the password authentication request may retrieve the requested information in various ways. For example, in some embodiments, the UE may present a message requesting that the password be entered into the UE via a user interface. For example, the request for the user to enter a password may take the form of a dialog box presented on a display, or the request may be an audible request. In other embodiments, upon receiving the password request, the UE may automatically fetch a password stored in the UE, such as in configuration storage, so that authentication can take place automatically without user intervention. It is to be noted that various combinations of authentication information may be required/provided according to different embodiments. In case of AAA-based enterprise authentication both username/password-based as well as certificate-based authentication methods are possible according to the present embodiments.

In further embodiments involving password-based authentication for a UE that is accessing a home network, at least some of the authentication procedures may be conducted between a requesting UE and an MME. In such embodiments, a set of password/authentication procedures and/or information may be configured in the MME by a hosting party of the home network. Once the MME is configured with the proper authentication information/procedure, the requesting UE may be authenticated by the MME during a procedure, such as a PDN connectivity request.

Figure 8:
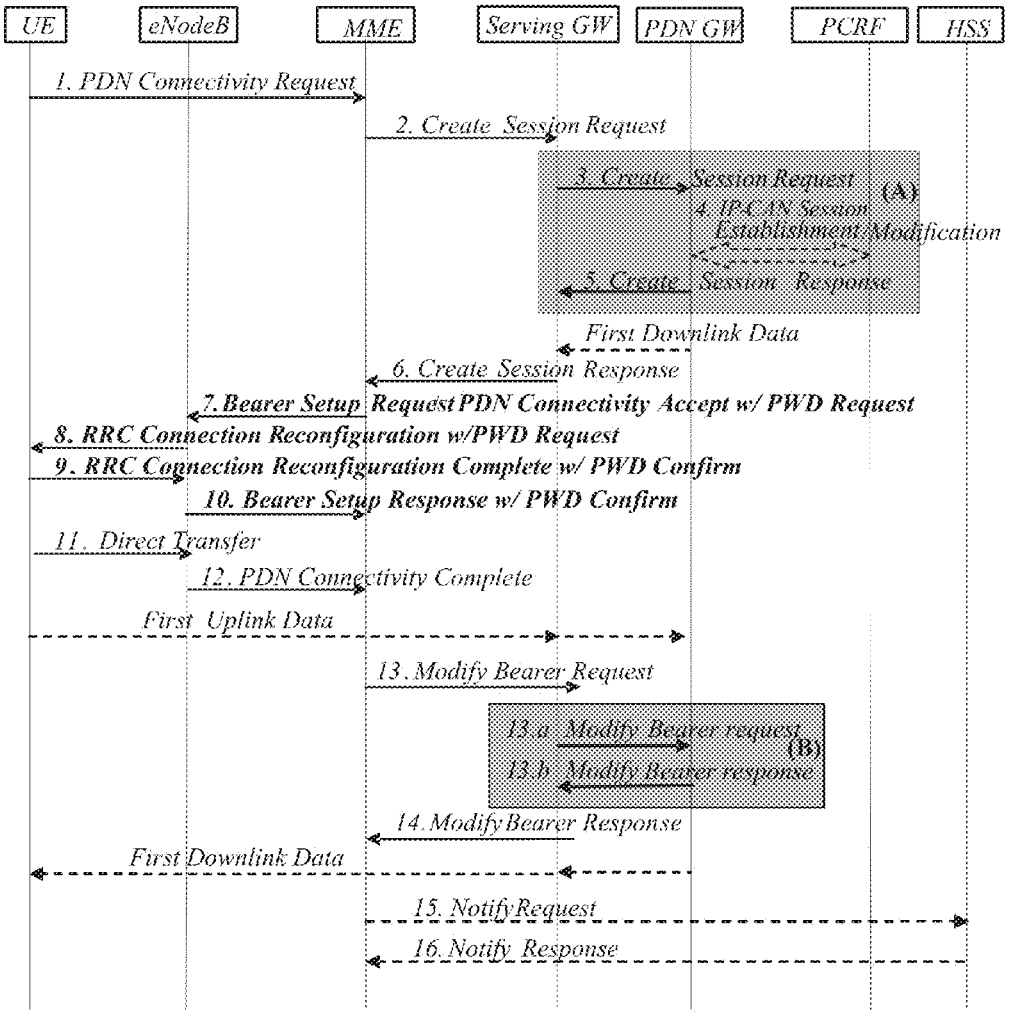
FIG. 8 depicts exemplary signaling operations for authentication to a home network consistent with still other embodiments.

FIG. 8 depicts exemplary signaling for authentication to a home network consistent with further embodiments using MME-facilitated authentication. As with FIG. 6, the set of operations shown in FIG. 8 present a modification of the operations specified in §5.10.2 of 3GPP TS 23.401. Again, in the example of FIG. 8, the operations depicted in bold represent modified or augmented procedures with respect to the conventional procedures of §5.10.2. As with the authentication procedure that takes place via an H(e)NB illustrated generally at FIG. 6, the procedures of the embodiment of FIG. 8 also entail modifying or supplementing the following operations: 8. RRC connection reconfiguration and 9. RRC connection reconfiguration complete. However, because the MME is involved in the authentication procedure these additional messages may also be modified: 7. Bearer Setup Request/PDN Connectivity Accept and 10. Bearer Setup Response may also be modified to include password information as illustrated. The latter two messages take place between the MME and H(e)NB and serve to transmit the authentication information between the MME and UE, which is communicatively linked to the H(e)NB via the messages RRC connection reconfiguration and 9. RRC connection reconfiguration complete. Thus, the Bearer Setup Request/PDN Connectivity Accept message may be modified or supplemented so that a password request is also transmitted. Likewise, the Bearer Setup Response message may be modified/supplemented to transmit a password response that is forwarded by the H(e)NB from information transmitted by the UE in the RRC connection reconfiguration complete message.

In further embodiments in which a UE is authenticated to a home network during a PDN connectivity request procedure, authentication may take place during initial operations. For example, turning again to FIG. 8, authentication may take place or may be initiated between the operation 1. PDN Connectivity Request that is sent to the MME, and the operation 2. Create Session Request. The authentication process may take place in parallel to the operations 2-6. In some embodiments, new RRC messages and S1 messages (messages between H(e)NB and core network) may be added to facilitate the authentication process.

Figure 9:
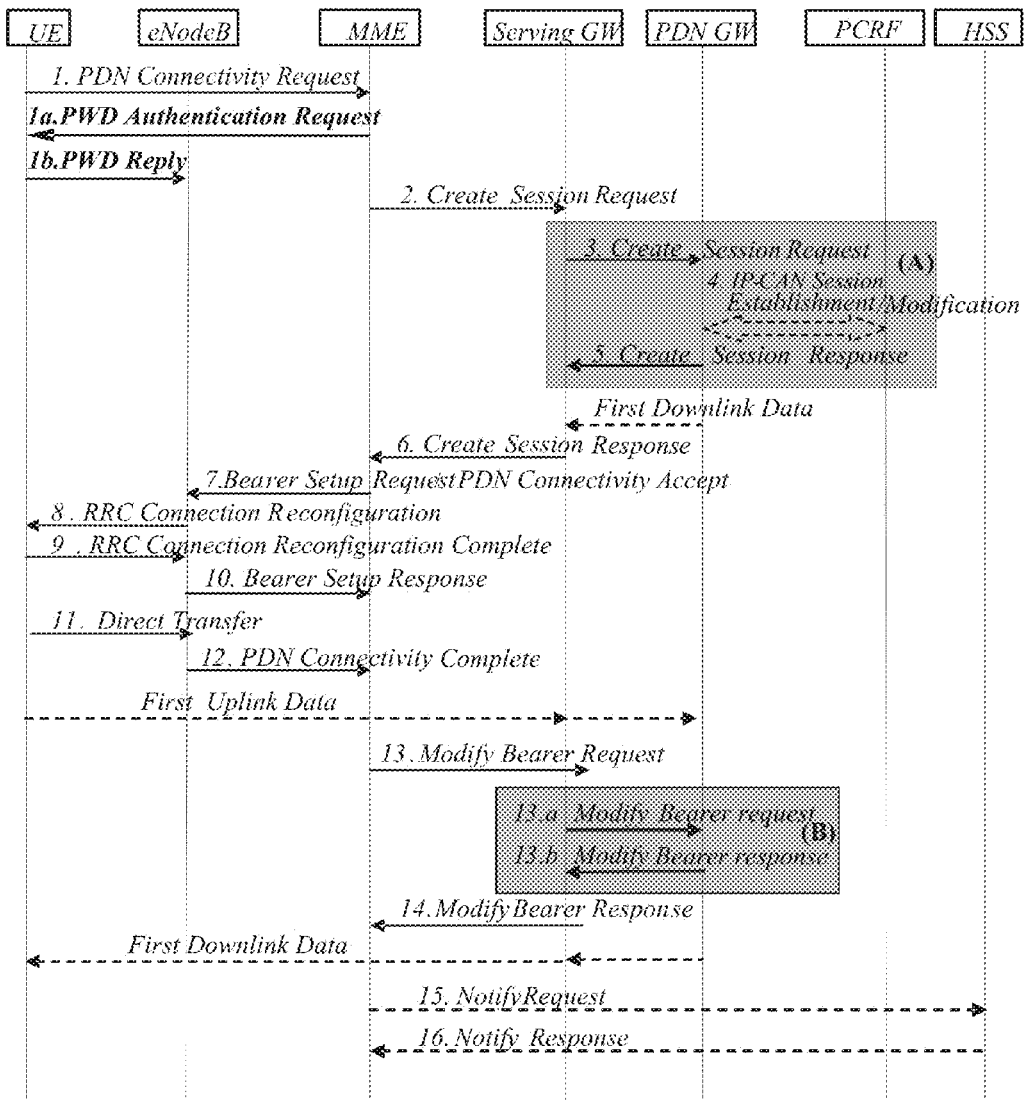
FIG. 9 depicts exemplary signaling operations for authentication to a home network consistent with still further embodiments.

FIG. 9 depicts exemplary signaling operations for authentication to a home network consistent with further embodiments. As with FIGS. 6 and 8, the set of operations shown in FIG. 9 present a modification of the operations specified in §5.10.2 of 3GPP TS 23.401. Again, in the example of FIG. 9, the operations depicted in bold represent modified or augmented procedures with respect to the conventional procedures of §5.10.2. In this case, a set of authentication operations is added after the operation 1. PDN Connectivity Request. The operation 1a. PWD authentication request is performed by the MME, which sends a request for receipt by the UE. In the example shown, the UE may reply with the operation 1b. PWD Reply, which may be sent to the H(e)NB in cases where the H(e)NB requires authentication for access to its network.

Figure 10:
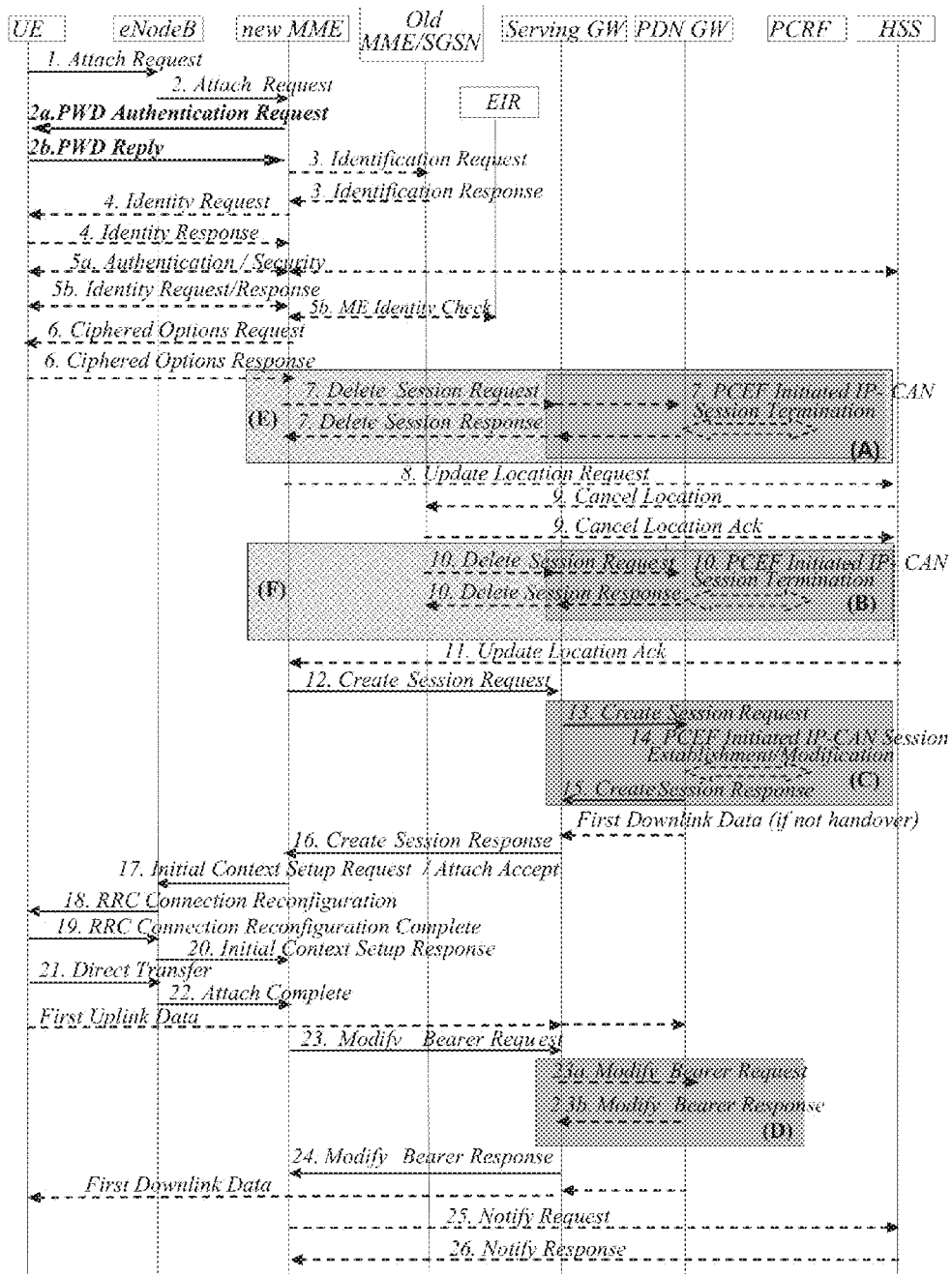
FIG. 10 depicts exemplary signaling operations for authentication to a home network during an initial attach procedure consistent with various embodiments.

FIG. 10 depicts exemplary signaling operations for authentication to a home network during an initial attach procedure consistent with other embodiments. Again, in the example of FIG. 10, the operations depicted illustrate modified or augmented procedures with respect to the conventional procedures of §5.3.2.1 of 3GPP TS 23.401. In this case, a set of authentication operations is added after the operation 2. Attach Request. The operation 2a. PWD authentication request is performed by the MME, which sends a request for receipt by the UE. In the example shown, the UE may reply with the operation 1b. PWD Reply, which may be sent to the MME in cases where the MME is configured to authenticate a requesting UE to the home network. It is to be noted that in some embodiments other S1 and RRC messages may added after the operation 2 to facilitate authentication. Moreover, in further embodiments, the authentication may take place between the UE and H(e)NB in cases where the H(e)NB is configured with the authentication information/procedures.

In still further embodiments of password-based authentication to a home network, an H(e)NB may trigger authentication upon reception (i.e., forwarding the received PDN connectivity request to the MME) of a PDN Connectivity Request. In such embodiments, no new S1 messages may be needed, and only new RRC messages may be required for authentication.

In other embodiments, instead of employing password-based procedures, the control of access to a home network may involve an access list that contains information pertaining to devices permitted to access the home network. An access list may be based upon a convenient identifier of a UE, such as an international mobile subscriber identity (IMSI), which is provided in every UE. In one embodiment, an H(e)NB hosting party may configure via a web interface or other convenient entity a list of IMSIs that are permitted to connect to the home network. Such a list may constitute a closed subscriber group in some embodiments.

However, since an H(e)NB may not in general discern the IMSI of a UE device requesting PDN connectivity, the H(e)NB may therefore not be equipped to enforce access control based upon the IMSI of a requesting UE device. Accordingly, in keeping with various embodiments, when a UE transmits a PDN connectivity request, an H(e)NB may be triggered to retrieve a list of IMSIs corresponding to devices permitted to authenticate to the home network, and may forward this list to the MME for authentication. In some embodiments, the list of allowed IMSIs may be sent in to the MME in an S1 message that encapsulates the PDN Connectivity Request NAS message (either an S1 Initial UE message or S1 Uplink NAS Transport message). Upon receipt of the message, the MME may check the received list of approved IMSIs against the IMSI of the requesting UE, which may be discerned by the MME from normal signaling procedures.

Figure 11:
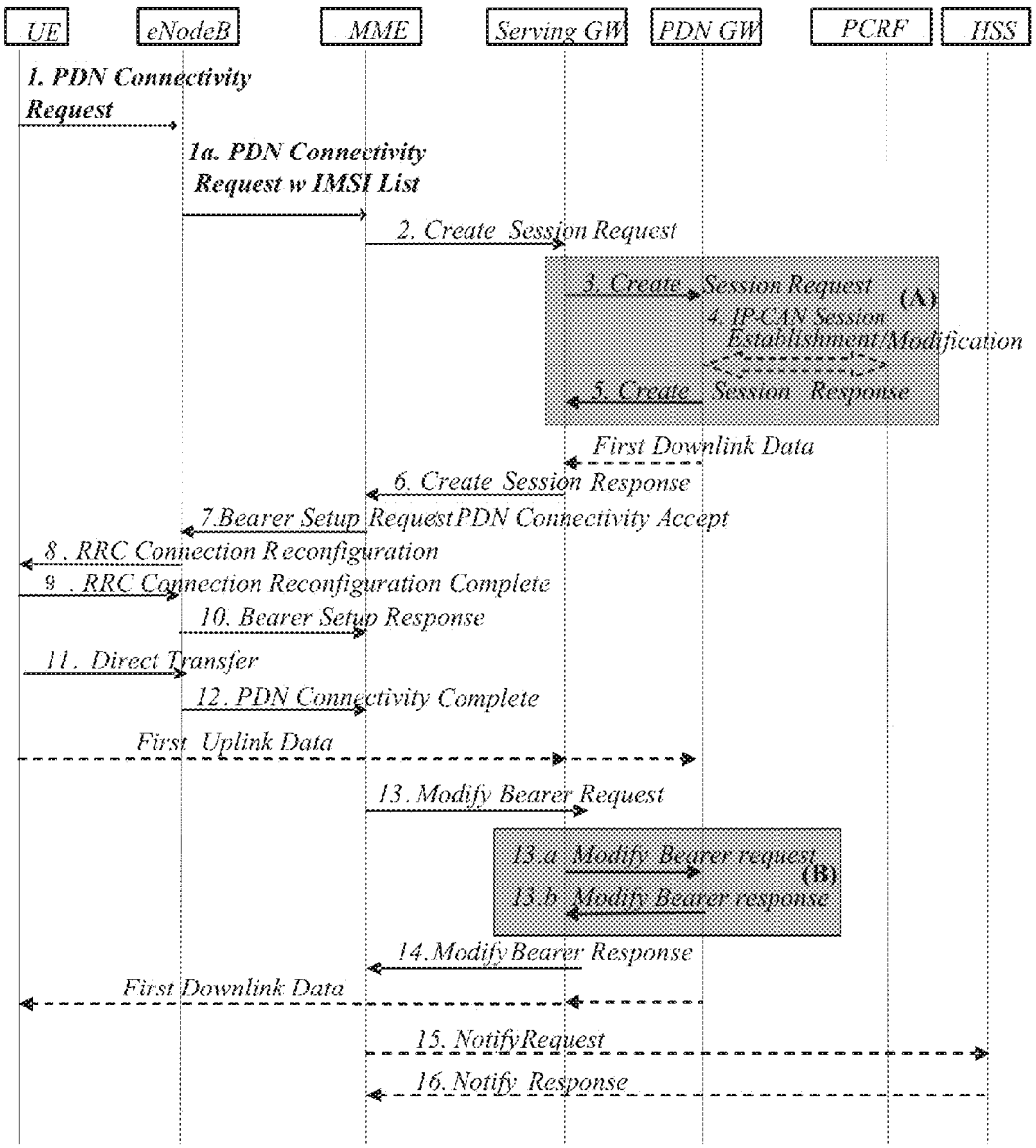
FIG. 11 depicts exemplary signaling operations for authentication to a home network according to other embodiments.

FIG. 11 depicts exemplary signaling for authentication to a home network consistent with further embodiments using access list-based authentication. As with FIG. 6, the set of operations shown in FIG. 11 present a modification of the operations specified in §5.10.2 of 3GPP TS 23.401. Again, in the example of FIG. 8, the operations depicted in bold represent modified or augmented operations with respect to the conventional procedures of §5.10.2. In the example shown, the operation 1. PDN connectivity request may be received by the H(e)NB. The PDN connectivity request operation may alert the H(e)NB that a device, whose identity may be unknown (at least to the H(e)NB) is attempting to access the home network of the H(e)NB. Accordingly, the H(e)NB may retrieve a list of IMSIs for devices authorized to attach to the home network, and may encapsulate this list in a message sent in the operation 1a PDN connectivity request with IMSI list, as further shown in FIG. 11.

When the MME receives the message containing the list of approved IMSIs, the MME may take various actions. If the IMSI of the UE requesting PDN connectivity is not included in the list of allowed IMSIs the MME may respond to the message PDN connectivity request with IMSI list, with a PDN Connectivity Reject message (not shown in FIG. 11). However, if the IMSI of the requesting UE does appear on the list of allowed IMSIs, the MME may proceed to act upon the PDN Connectivity Request, triggering the subsequent operations 2-16 of FIG. 11 to be performed to complete the access process of the requesting UE to the home network.

Figure 12:
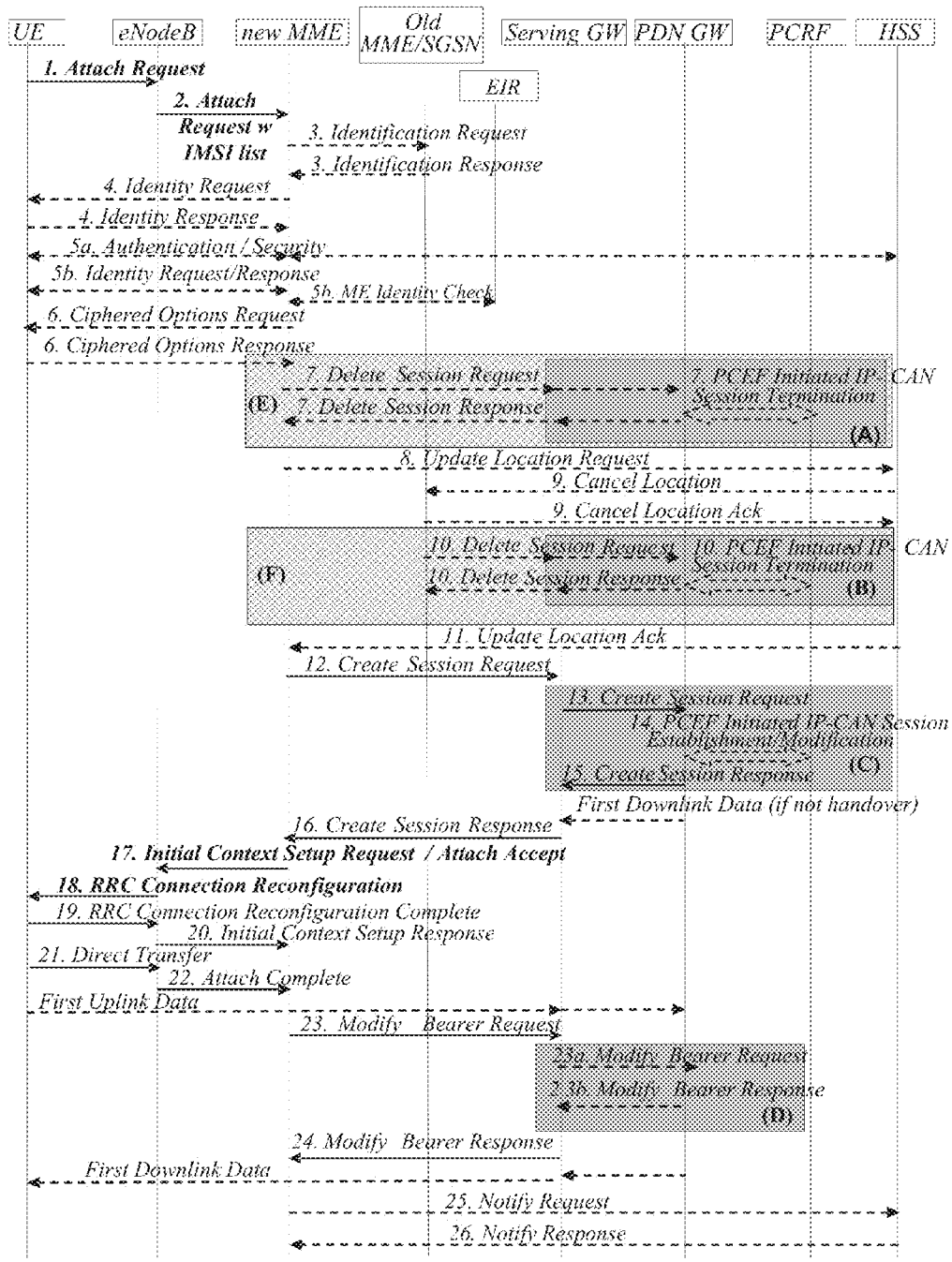
FIG. 12 depicts exemplary signaling operations for authentication to a home network during initial attach operations consistent with further embodiments.

In further embodiments, when connectivity to a home network is requested as part of an Initial Attach Request, authentication to the home network may be scheduled during operations such as sending the Attach Request and Initial Context Setup Request/Attach Accept message exchange as illustrated in FIG. 12. In particular, FIG. 12 depicts exemplary signaling operations for authentication to a home network during initial attach request operations based upon access list control. The set of operations shown in FIG. 12 present a modification of the operations specified in §5.3.2.1 of 3GPP TS 23.401, and as with the previous FIGs., the operations depicted in bold represent modified or augmented procedures with respect to the conventional procedures of §5.3.2.1.

As suggested FIG. 12, during the initial operation 1. Attach Request, when the UE sends a message to the H(e)NB, receipt of an attach request message alerts the H(e)NB that a device, whose identity may be unknown (at least to the H(e)NB) is attempting to access the home network of the H(e)NB. Accordingly, the H(e)NB may retrieve a list of IMSIs for devices authorized to attach to the home network, and may encapsulate this list in a message sent in the operation 2 Attach Request with IMSI list, which represents a modification of the conventional Attach Request message.

If the IMSI of the UE requesting attachment is not included in the list of allowed IMSIs the MME may respond to the Attach Request with IMSI list, with an Attach Request Rejection message (not shown in FIG. 12). However, if the IMSI of the requesting UE does appear on the list of allowed IMSIs, the MME may proceed with the Attach Request, triggering performance of the subsequent operations 3-26 of FIG. 12 in order to complete the access process of the requesting UE to the home network. The Initial Context Setup Request/Attach Accept and RRC Connection Reconfiguration operations may also be modified, as illustrated.

In additional embodiments, the list of acceptable IMSIs may be preconfigured by a user in the MME of the user's PLMN instead of in the H(e)NB of the home network. When an attach request or PDN connectivity request is initiated by a UE, the changes to conventional operations may still be performed, such as those illustrated in FIGS. 11 and 12, except that access list information may not be transferred from an H(e)NB during the connection process, since such information already is resident at the MME.

As noted above, home networks having multiple nodes may be configured with authentication in more than one node. In some embodiments in which a home network includes multiple H(e)NBs and multiple local gateways (L-GWs), it may be impractical or not possible for a user to individually configure authentication in all the H(e)NBs. Consistent with the present embodiments, this scenario may be addressed in different ways. In one embodiment, authentication may be configured to a first H(e)NB, which authentication is subsequently propagated by the first H(e)NB to other H(e)NBs of the home network. In this case, responsibility for subsequent authentication of a requesting UE may rest with the H(e)NBs.

In other embodiments, the authentication may be configured in the MME, which configuration may take place via any H(e)NB of the home network, which originally receives the authentication information from a user and subsequently transmits the authentication information to the MME. In these latter embodiments the MME may be responsible for authentication of requesting UEs so that the requesting UE may be authenticated to any H(e)NB of the home network.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 13:
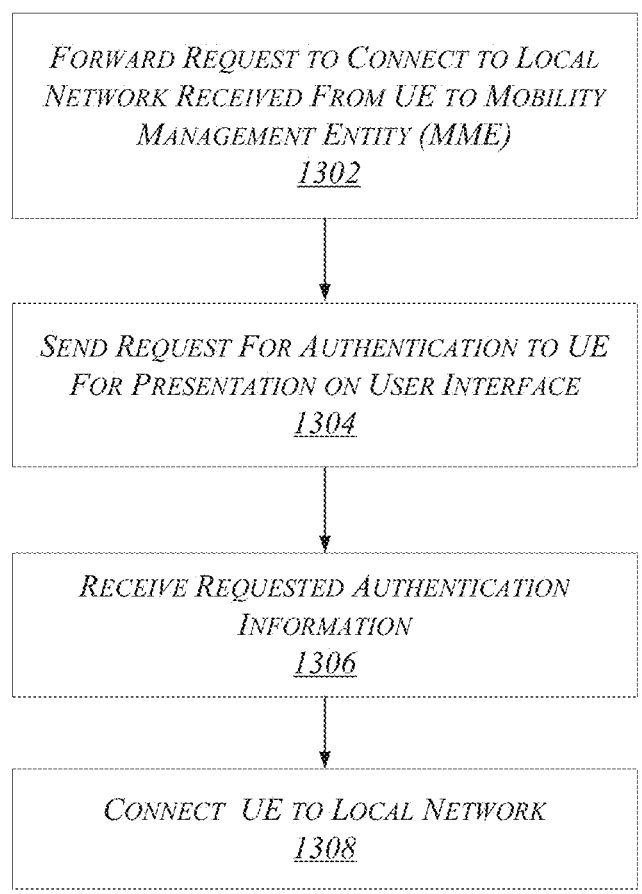
FIG. 13 depicts an exemplary logic flow.

FIG. 13 depicts an exemplary logic flow 1300. At block 1302, a request to connect to a local network received from a UE is forwarded to a mobility management entity of a network, such as a public land mobile network. At block 1304 a request for authentication is sent to the UE in response to the request to connect. The request for authentication may be sent after receiving a message from the MME, such as a bearer setup request message. The request for authentication may be sent for presentation on a user interface, such as a user interface on the UE. At block 1306 the requested authentication information is received. At block 1308, the UE is connected to the local network.

Figure 14:
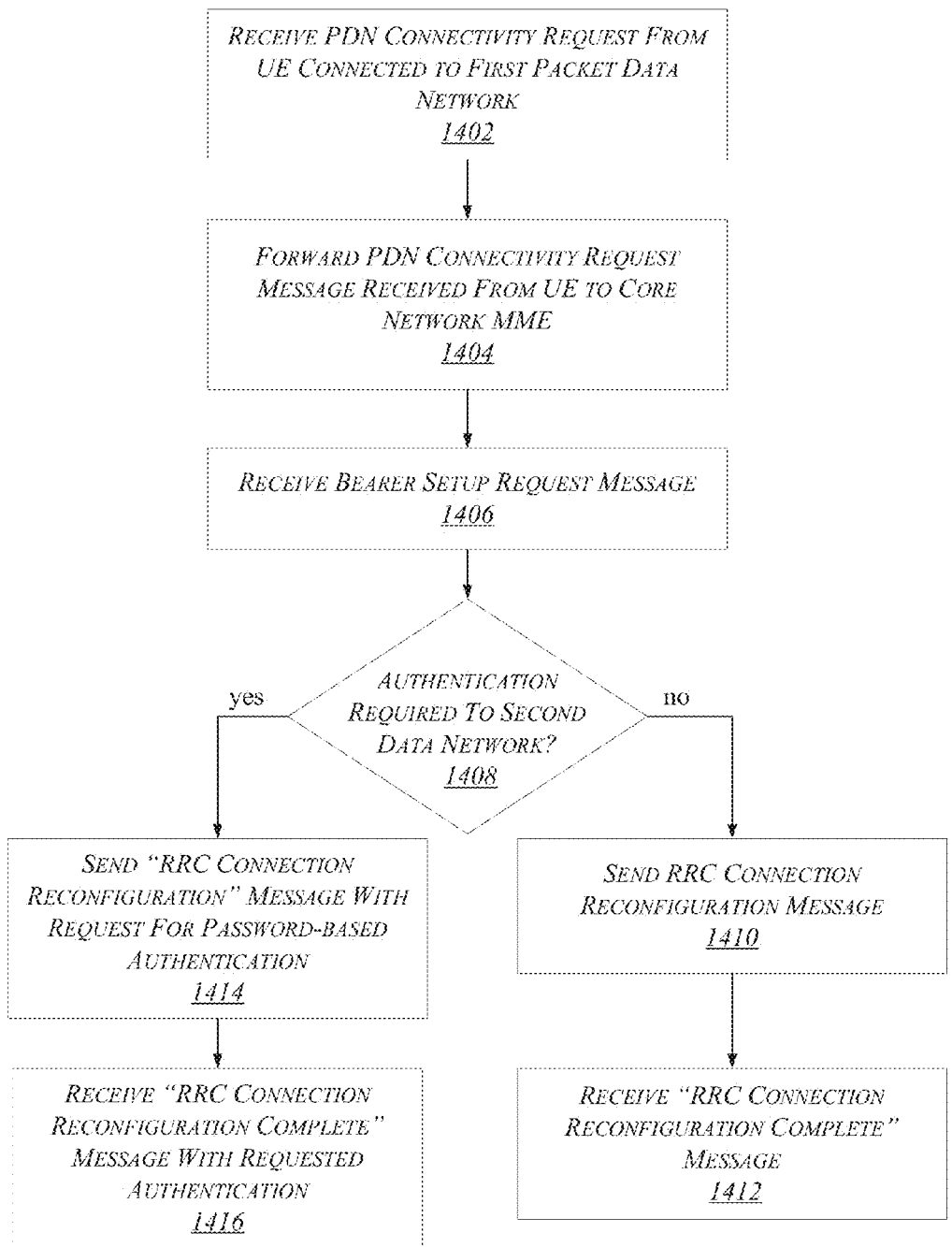
FIG. 14 depicts a logic flow consistent with additional embodiments.

FIG. 14 depicts another exemplary logic flow 1400. At block 1402, a PDN connectivity request message is received from a UE that is connected to a first packet data network. At block 1404, the PDN connectivity request message is sent to an MME of a core network of a public land mobile network. At block 1406, a bearer setup request message is received. At block 1408, a determination is made as to whether authentication is required to the second packet data network. If not, the flow moves to block 1410, where an RRC connection reconfiguration message is received. The flow then moves to block 1412 where an RRC connection reconfiguration complete is returned. If authentication is required, the flow moves to block 1414. At block 1414, an RRC connection reconfiguration message is received including a request for password-based authentication. At block 1416, an RRC connection reconfiguration complete message is returned together with the requested authentication.

Figure 15:
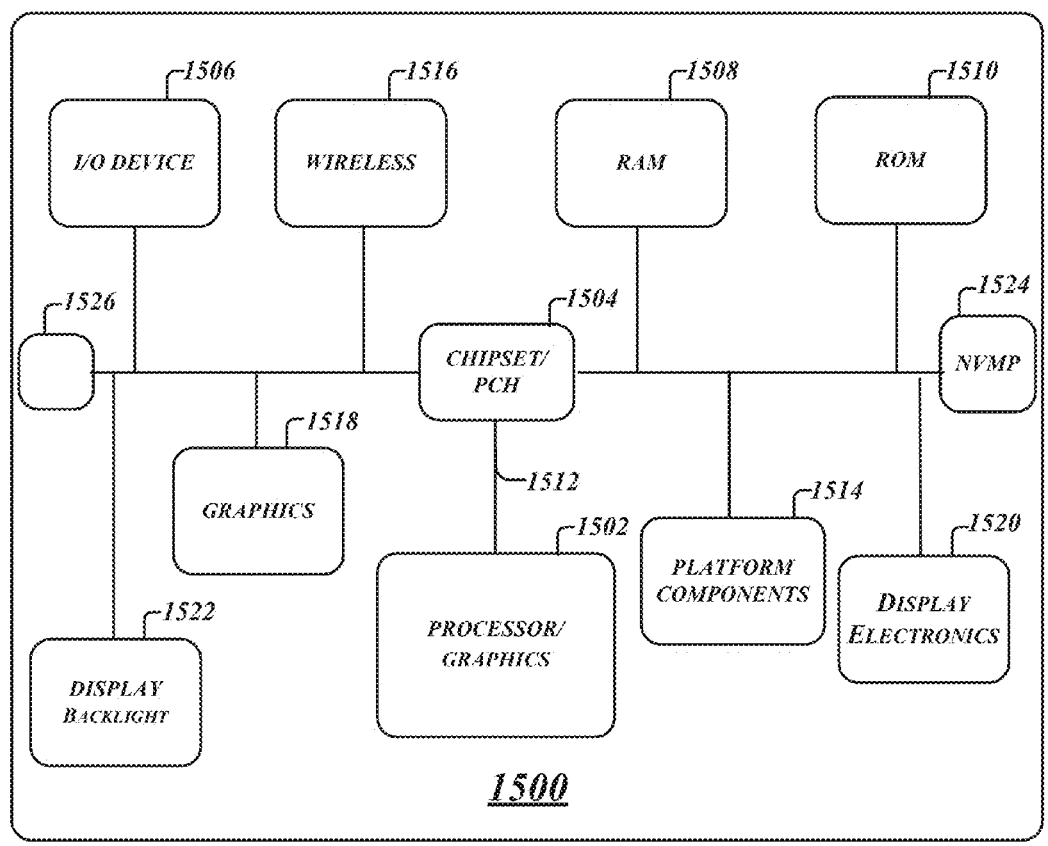
FIG. 15 is a diagram of an exemplary system embodiment.

FIG. 15 is a diagram of an exemplary system embodiment and in particular, FIG. 15 is a diagram showing a platform 1500, which may include various elements. For instance, FIG. 15 shows that platform (system) 1510 may include a processor/graphics core 1502, a chipset/platform control hub (PCH) 1504, an input/output (I/O) device 1506, a random access memory (RAM) (such as dynamic RAM (DRAM)) 1508, and a read only memory (ROM) 1510, display electronics 1520, display backlight 1522, and various other platform components 1514 (e.g., a fan, a crossflow blower, a heat sink, DTM system, cooling system, housing, vents, and so forth). System 1500 may also include wireless communications chip 1516 and graphics device 1518. The embodiments, however, are not limited to these elements.

As shown in FIG. 15, I/O device 1506, RAM 1508, and ROM 1510 are coupled to processor 1502 by way of chipset 1504. Chipset 1504 may be coupled to processor 1502 by a bus 1512. Accordingly, bus 1512 may include multiple lines.

Processor 1502 may be a central processing unit comprising one or more processor cores and may include any number of processors having any number of processor cores. The processor 1502 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1502 may be multiple separate processors located on separate integrated circuit chips. In some embodiments processor 1502 may be a processor having integrated graphics, while in other embodiments processor 1502 may be a graphics core or cores.

Figure 16:
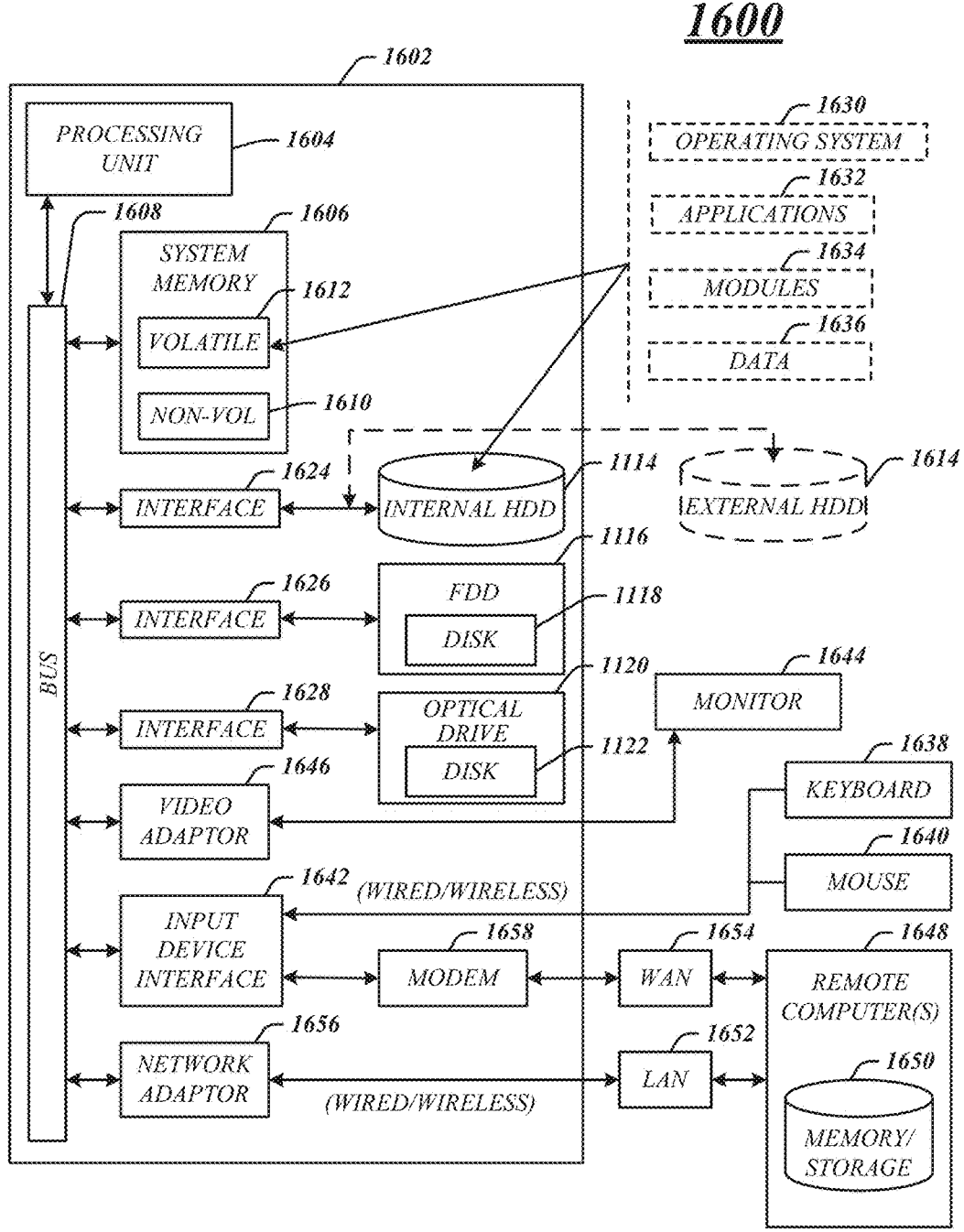
FIG. 16 illustrates an embodiment of an exemplary computing architecture.

FIG. 16 illustrates an embodiment of an exemplary computing system (architecture) 1600 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1600.

As shown in FIG. 16, the computing architecture 1600 comprises a processing unit 1604, a system memory 1606 and a system bus 1608. The processing unit 1604 can be any of various commercially available processors. Dual microprocessors and other multi processor architectures may also be employed as the processing unit 1604. The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures.

The computing architecture 1600 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636.

A user can enter commands and information into the computer 1202 through one or more wire/wireless input devices, for example, a keyboard 1638 and a pointing device, such as a mouse 1640. Other input devices may include a microphone, an infra-red (IR) remote control, a joystick, a game pad, a stylus pen, touch screen, or the like. These and other input devices are often connected to the processing unit 1604 through an input device interface 1642 that is coupled to the system bus 1608, but can be connected by other interfaces such as a parallel port, IEEE 1294 serial port, a game port, a USB port, an IR interface, and so forth.

A monitor 1644 or other type of display device is also connected to the system bus 1608 via an interface, such as a video adaptor 1646. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Embodiments may also be at least partly implemented as instructions contained in or on a non-transitory computer-readable medium, which may be read and executed by one or more processors to enable performance of the operations described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A home evolved node B (HeNB), comprising:
a transceiver;
a processor circuit coupled to the transceiver; and
a local packet data network access module operable on the processor circuit to:
   schedule for transmission from the transceiver to a mobility management entity (MME) a request from a user equipment (UE) for access to a local network;
   identify a password-based authentication request comprised in a Bearer Setup Request message received from the MME;
   generate a request for password-based authentication to be sent to the UE in a radio resource control (RRC) Connection Reconfiguration message;
   receive an RRC Connection Reconfiguration Complete message from the UE comprising authentication information sent in response to the request for password-based authentication; and
   schedule a Bearer Setup Response message for transmission to the MME, the Bearer Setup Response message to comprise the authentication information.

2. The HeNB of claim 1, the request for access comprising a packet data network connectivity (PDN) request to be forwarded to a mobility management entity of a public land mobile network.

3. The HeNB of claim 1, the local packet data network access module operable on the processor circuit to:
   verify the authentication information received in response to the request for password-based authentication.

4. The HeNB of claim 1, comprising an outside packet data network access module to maintain a connection to an outside packet data network while the connection to the local network is active.

5. The HeNB of claim 1, the local packet data network access module operable on the processor circuit to retrieve a password from a memory of the apparatus in response to the request for access.

6. The HeNB of claim 1, the request for access comprising a message to be forwarded in an attach request for the MME.

7. The HeNB of claim 1, the local packet data network access module operable on the processor circuit to:
   schedule the request for access for transmission by the transceiver to the MME;
   generate a request for authentication to link the UE to the local network in response to the request for access; and
   verify authentication information sent in response to the request for authentication.

8. The HeNB of claim 1, the local packet data network access module operable on the processor circuit to:
   retrieve a list of international mobile subscriber identities (IMSI) of devices permitted access to the local packet data network, in response to the request for access; and
   forward the list to the MME.

9. The HeNB of claim 1, the request for access comprising a packet data network connectivity (PDN) request to be forwarded to the MME.

10. The HeNB of claim 1, the request for access comprising a message to be forwarded in an attach request for the MME.

11. A method performed by a home evolved node B (HeNB), comprising:
   receiving, at the HeNB, a request of a user equipment (UE) for access to a local packet data network;
   scheduling for transmission to a mobility management entity (MME) the request for access;
   identifying a password-based authentication request comprised in a Bearer Setup Request message received from the MME;
   sending a request for password-based authentication from the HeNB to the UE in a radio resource control (RRC) Connection Reconfiguration message;
   receiving an RRC Connection Reconfiguration Complete message from the UE comprising authentication information at the HeNB in response to the request for password-based authentication; and
   scheduling a Bearer Setup Response message for transmission to the MME, the Bearer Setup Response message to comprise the authentication information.

12. The method of claim 11, comprising:
   verifying the authentication information received in response to the request for authentication.

13. At least one non-transitory computer-readable storage medium comprising a plurality of instructions that, when executed, cause a home evolved node B (HeNB) to:
   schedule for transmission to a mobility management entity (MME) a request from a user equipment (UE) for access to a local network;
   identify a password-based authentication request comprised in a Bearer Setup Request message received from the MME;
   generate a request for password-based authentication to be sent to the UE in a radio resource control (RRC) Connection Reconfiguration message;
   receive an RRC Connection Reconfiguration Complete message from the UE comprising authentication information sent in response to the request for password-based authentication; and
   schedule a Bearer Setup Response message for transmission to the MME, the Bearer Setup Response message to comprise the authentication information.

14. The at least one non-transitory computer-readable storage medium of claim 13 comprising instructions that, when executed, cause the HeNB to:
   verify the authentication information received in response to the request for authentication.

15. The at least one non-transitory computer-readable storage medium of claim 13, comprising instructions that, when executed, cause the HeNB to maintain a connection to an outside packet data network while the connection to the local network is active.

16. The at least one non-transitory computer-readable storage medium of claim 13 comprising instructions that, when executed, cause the HeNB to retrieve a password from a memory of the apparatus in response to the request for access.

17. The at least one non-transitory computer-readable storage medium of claim 13 comprising instructions that, when executed, cause the HeNB to:

schedule the request for access for transmission to the MME;

generate a request for authentication to link the UE to the local network in response to the request for access; and verify authentication information sent in response to the request for authentication.

18. The at least one non-transitory computer-readable storage medium of claim 13 comprising instructions that, when executed, cause the HeNB to:

retrieve a list of international mobile subscriber identities (IMSI) of devices permitted access to the local packet data network, in response to the request for access; and forward the list to the MME.

* * * * *